United States Patent
Österlund

(10) Patent No.: US 6,176,666 B1
(45) Date of Patent: Jan. 23, 2001

(54) SPACING SLEEVE

(75) Inventor: Carl-Gunnar Österlund, Vallentuna (SE)

(73) Assignee: Fatum Produkt AB, Vallentuan (SE)

( * ) Notice: Under 35 U.S.C. 154(b), the term of this patent shall be extended for 0 days.

(21) Appl. No.: 09/242,679

(22) PCT Filed: Aug. 13, 1997

(86) PCT No.: PCT/SE97/01345

§ 371 Date: Feb. 19, 1999

§ 102(e) Date: Feb. 19, 1999

(87) PCT Pub. No.: WO98/07997

PCT Pub. Date: Feb. 26, 1998

(30) Foreign Application Priority Data

Aug. 19, 1996 (SE) .................................................... 9603017

(51) Int. Cl.$^7$ ...................................................... F16B 43/00
(52) U.S. Cl. ............................................. 411/535; 411/546
(58) Field of Search .................... 411/3–5, 531, 411/535, 536, 546

(56) References Cited

U.S. PATENT DOCUMENTS

| 4,747,737 | 5/1988 | Roffelsen . | |
|---|---|---|---|
| 5,015,132 | * 5/1991 | Turner et al. | 411/5 X |
| 5,921,737 | * 7/1999 | Ibey | 411/546 X |

FOREIGN PATENT DOCUMENTS

| 459388 | 7/1989 | (SE) . | |
|---|---|---|---|
| 675622 | * 10/1990 | (SE) | 411/546 |

OTHER PUBLICATIONS

Richco, European Catalogue 1, Specialists in Manufacturing Quality Fasteners.

* cited by examiner

*Primary Examiner*—Neill Wilson
(74) *Attorney, Agent, or Firm*—Browdy and Neimark

(57) ABSTRACT

A spacing sleeve (10) for use when mounting an object (20) at a certain distance in front of a wall (19) by means of a screw (18) extending through the spacing sleeve comprises a tubular body (11), having two opposite bearing surfaces (12, 13), located each at one end of the body, and holding means (14), connected to the body (11) and located at one end thereof, for releasably holding the spacing sleeve (10) to said object (20) during the mounting of the latter. At its other end, the body (11) is provided with means (21), adapted to receive said holding means (14) of another spacing sleeve (10) in releasable engagement therewith and to permit two or more spacing sleeves (10) to be stacked upon each other and to be releasably held to each other in a mutually centered state and with facing bearing surfaces (12, 13) of the bodies (11) of adjacent spacing sleeves (10) in contact with each other.

13 Claims, 1 Drawing Sheet

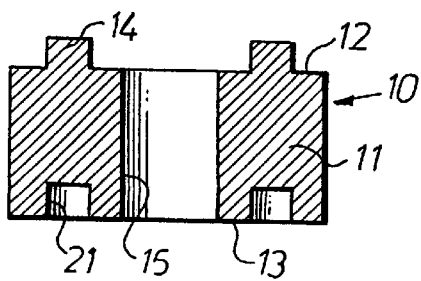
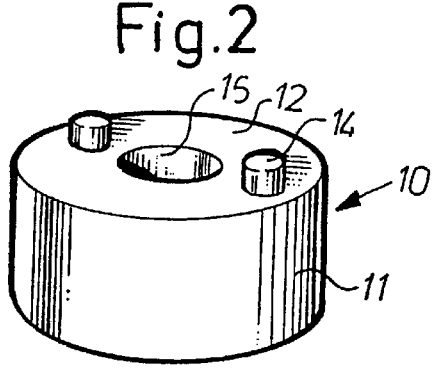
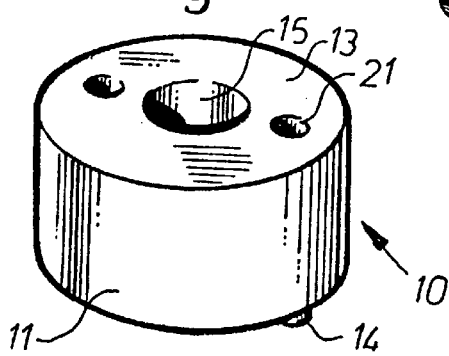
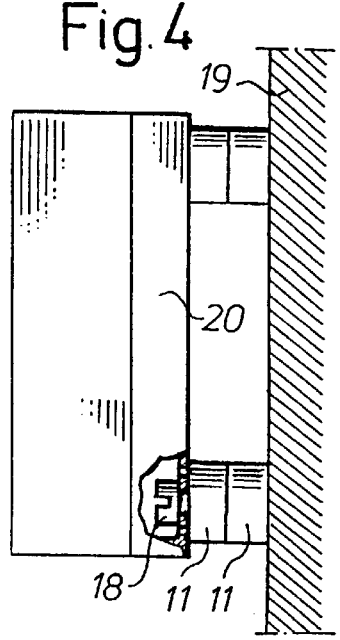
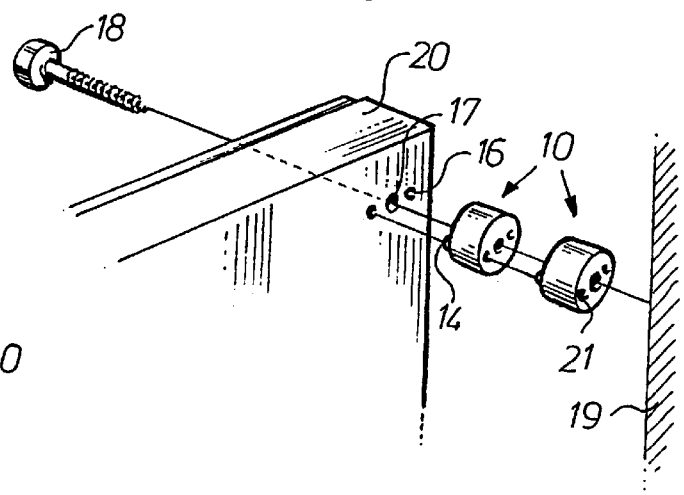

SPACING SLEEVE

BACKGROUND OF THE INVENTION

1. Technical Field of the Invention

The present invention relates to a spacing sleeve.

More particularly, the invention relates to a spacing sleeve of the kind intended to be used when mounting an object at a certain distance in front of a wall or other similar supporting member by means of a screw of other similar fastening means extending through the spacing sleeve, and which comprises a tubular body, having two opposite bearing surfaces, located each at one end of the body, and holding means, connected to the body and located at one end thereof, for releasably holding the spacing sleeve to said object during the mounting of the latter.

2. Prior Art

A disadvantage of spacing sleeves of said kind, previously known, is that each individual spacing sleeve can be utilized only for mounting an object at a single predetermined distance from the supporting member, corresponding to the length of the spacing sleeve. However, within many fields of application of such spacing sleeves, it may be desirable to vary the distance between the object and the supporting member from case to case. By way of example, one such application field is the mounting of casings for eletric terminal blocks or other electric or electronic equipment, to which electric wires are to be drawn in through lead-in openings in rear wall portions of the casings, which for that purpose are mounted at the required distance in front of a building wall or other similar supporting member. The required mounting distance varies strongly in dependence upon the thickness and stiffness of said wires. In order to make it possible, in each separate case, to mount such an equipment casing at an appropriately selected distance, it has previously been necessary for an installer to have a large assortment of spacing sleeves of mutually different lengths at hand.

OBJECT AND SUMMARY OF THE INVENTION

The invention has for its purpose to provide an improved spacing sleeve of the kind initially specified which makes it possible to mount an object at a plurality of different selectable distances from a supporting member, located behind said object, without requiring the installer to have at hand a number of spacing sleeves of mutually different lengths corresponding to the number of different selectable distances.

The spacing sleeve, according to the invention proposed for said purpose, is primarily characterized in that, at its other end, the body is provided with means, adapted to receive said holding means of another spacing sleeve in releasable engagement therewith and to permit two or more spacing sleeves to be stacked upon each other and to be releasably held to each other in a mutually centered state and with facing bearing surfaces of the bodies of adjacent spacing sleeves in contact with each other.

The possibility of stacking two or more spacing sleeves upon each other offered by the invention results in that it will be possible, by means of spacing sleeves of one single length, to mount an object at a plurality of different distances from a supporting member located behind said object. In order to make is possible, in the case of larger mounting distances, to reduce the number of spacing sleeves that have to be stacked upon each other, the spacing sleeve according to the invention may however suitably be manufactured in two different body lengths, in which case the longer body length may constitute a multiple of the shorter body length and for instance amount to three or four times the shorter body length.

The spacing sleeve according to the invention may preferably be produced through injection moulding it in one piece from a suitable plastic. In order to make it possible, in this case, to give the spacing sleeve a shape which is favourable in view of the production method utilized, said holding means may suitably comprise one or more projections, each extending in an axial direction from the bearing surface located at said one end of the body, while, at its other end, the body may be provided with a corresponding number of recesses, each extending in an axial direction into the body from the bearing surface located at this end and serving to receive one of said projections of another spacing sleeve.

Said recesses may suitably be adapted to receive said projections of another spacing sleeve in releasable frictional engagement therewith. However, as an alternative, the recesses and the projections may instead be designed for snap-in engagement with each other.

According to a preferred embodiment of the invention, the spacing sleeve may have two or more projections and recesses which are uniformly distributed around the longitudinal axis of the body. In this case, the projections may suitably have the shape of short cylindrical pins, while the recesses may have the shape of short cylindrical holes. In order to facilitate the insertion of said pins of a first spacing sleeve into said holes of a second spacing sleeve, the holes may suitably have mouth portions which are slightly widening in an outward direction.

BRIEF DESCRIPTION OF THE DRAWINGS

Below the invention is further described with reference to the accompanying drawing, in which:

FIG. 1 shows a side elevation, in cross-section, of a spacing sleeve according to an embodiment of the invention elected by way of example, FIGS. 2 and 3 are perspective views, showing said spacing sleeve seen in an inclined direction from its front end and in an inclined direction from its rear end, respectively, FIG. 4 shows a lateral view of a casing for electric terminal blocks or other electric or electronic equipment, said casing having the shape of a parallel-epipedic box and being mounted to a wall, located behind the casing, by means of a number of spacing sleeves of the kind shown in FIGS. 1 to 3 and screws extending through said sleeves, and FIG. 5 shows a partial exploded perspective view, further illustrating the mounting of the casing of FIG. 4 to said wall.

DETAILED DESCRIPTION OF THE PREFERRED EMBODIMENT(S) OF THE INVENTION

The spacing sleeve shown in FIGS. 1 to 3 and generally designated 10 comprises a cylindrical tubular body 11 having two opposite bearing surfaces 12 and 13 which are located at each end of said body. At its front end, body 11 is provided with two short cylindrical pins 14 which project in axial directions from the bearing surface 12 located at said end and which are located diametrically opposite to each other at respective sides of the central through hole 15 in body 11, which serves as a passage for a fastening screw or other similar fastening means. The two pins 14 serve as holding means for spacing sleeve 10 which, in a manner indicated in FIGS. 4 and 5, may be inserted each into one of two holes 16 in an object 20, intended to be mounted to a wall 19, located behind said object. The two holes 16 are located at opposite sides of a hole 17 for a fastening screw 18. Through frictional engagement with the walls of holes 16, pins 14 may be releasably held to object 20 in a state in which bearing surface 12 bears against said object.

At its rear end, body 11 is provided with two short cylindrical holes 21 which extend in axial directions into body 11 from the bearing surface 13 located at said end and have a mouth which is slightly widening in an outward direction. The two holes 21 have for their purpose to receive and, through frictional engagement, releasably hold the two pins 14 of another spacing sleeve 10 inserted therein in order hereby to permit two or more spacing sleeves to be stacked upon each other in a mutually centered state in which they bear against each other by means of their facing bearing surfaces 12 and 13. The above possibility of stacking a number of spacing sleeves 10 upon each other and releasably holding them in close contact with each other makes it possible, while utilizing spacing sleeves of a single predetermined length, to vary the distance between object 20 and wall 19 in steps. This is especially favourable when, as indicated in FIGS. 4 and 5, the object in question consists of a box-shaped casing for some kind of electric or electronic equipment, which casing is intended to be mounted at a certain distance in front of a wall located therebehind in order hereby to permit electric wires to be drawn in into the casing through lead-in openings provided in the rear wall thereof.

Spacing sleeve 10 may preferably be produced through injection moulding from a suitable material. By way of example, one material which in practice has been found suitable is an acrylonitrile-butadiene-styrene plastic marketed under the trademark Sinkral and designated M 122.

Naturally, the dimensions of the spacing sleeve may vary in dependence upon the intended application field. However, only by way of example, it could be mentioned that a spacing sleeve intended to be used when mounting electric terminal boxes has been dimensioned as follows. The tubular body 11 has a height of 6.0 mm, an inner diameter of 3.8 mm and an outer diameter of 10.4 mm. Pins 14 have a diameter of 1.6 mm and a height of only 1.0 mm. Bores 21 have a depth of 1.5 mm and such a slightly smaller diameter than pins 14 as to cause pins 14 of a first spacing sleeve, when inserted into holes 21 of another spacing sleeve, to be brought into the required frictional engagement with the walls of said holes to make sure that the two spacing sleeves will be held together.

The invention is not restricted to the embodiment above described and shown in the drawings. Instead, many other embodiments are feasible within the scope of the invention as defined in the claims. For instance, the number of pins 14 and holes 21 may be selected larger than two. Furthermore, the illustrated cylindrical pins and holes may be replaced by projections and recesses of another shape.

What is claimed is:

1. Spacing sleeve (10) for use when mounting an object (20) at a certain distance in front of a wall (19) or other similar supporting member by means of a screw (18) or other similar fastening means extending through the spacing sleeve (10), said spacing sleeve comprising a tubular body (11), having two opposite bearing surfaces (12, 13), located each at one end of the body, a through hole passing through a center of the bearing surfaces wherein the through hole and the tubular body are coaxial, and holding means (14), connected to the body (11) and located at one end thereof, for releasably holding the spacing sleeve (10) in releasable engagement therewith and to permit two or more spacing sleeves (10) to be stacked upon each other and to be releasably held to each other in a mutually centered state and with facing bearing surfaces (12, 13) of the bodies (11) of adjacent spacing sleeves (10) in contact with each other.

2. Spacing sleeve according to claim 1, characterized in that said holding means comprise one or more projections (14), each extending in an axial direction from the bearing surface (12) located at said one end of the body (11), and in that, at its other end, the body (11) is provided with a corresponding number of recesses (21), each extending in an axial direction into the body (11) from the bearing surface (13) located at this end and serving to receive one of said projections (21) of another spacing sleeve (10).

3. Spacing sleeve according to claim 2, characterized in that said recesses (21) are adapted to receive said projections (14) of another spacing sleeve (10) in releasable frictional engagement therewith.

4. Spacing sleeve according to claim 2, characterized in that it has two or more projections (14) and recesses (15) which are uniformly distributed around the longitudinal axis of the body (11).

5. Spacing sleeve according to claim 4, characterized in that said projections have the shape of short cylindrical pins (14) and in that said recesses have the shape of short cylindrical holes (21).

6. Spacing sleeve according to claim 5, characterized in that said holes (21) have mouth portions which are slightly widening in an outward direction.

7. Spacing sleeve (10) for use when mounting an object (20) at a certain distance in front of a wall (19) or other similar supporting member by means of a screw (18) or other similar fastening means extending through the spacing sleeve (10), said spacing sleeve comprising a tubular body (11) having two opposite bearing surfaces (12, 13), located each at one end of the body, a through hole passing through a center of the bearing surfaces wherein said through hole and the tubular body are coaxial and holding means (14), connected to the body (11) and located at one end thereof, for releasably holding the spacing sleeve (10) to said object (20) during the mounting of the latter, characterized in that, at its other end, the body (11) is provided with means (21), adapted to receive said holding means (14) of another spacing sleeve (10) in releasable engagement therewith and to permit two or more spacing sleeves (10) to be stacked upon each other and to be releasably held to each other in a mutually centered state and with facing bearing surfaces (12, 13) of the bodies (11) of adjacent spacing sleeves (10) in contact with each other, and wherein said holding means comprise one or more projections (14), each extending in an axial direction from the bearing surface (12) located at said one end of the body (11), and wherein, at its other end, the body (11) is provided with a corresponding number of recesses (21), each extending in an axial direction into the body (11) from the bearing surface (13) located at this end and serving to receive one of said projections (14) of another spacing sleeve (10).

8. Spacing sleeve (10) for use when mounting an object (20) at a certain distance in front of a wall (19) or other similar supporting member by means of a screw (18) or other similar fastening means extending through the spacing sleeve (10), said spacing sleeve comprising a tubular body (11) having two opposite bearing surfaces (12, 13), located each at one end of the body, a through hole passing through a center of the bearing surface wherein said through hole and the tubular body are coaxial and holding means (14), connected to the body (11) and located at one end thereof, for releasably holding the spacing sleeve (10) to said object (20) during the mounting of the latter, characterized in that, at its other end, the body (11) is provided with means (21), adapted to receive said holding means (14) of another spacing sleeve (10) in releasable engagement therewith and to permit two or more spacing sleeves (10) to be stacked upon each other and to be releasably held to each other in a mutually centered state and with facing bearing surfaces (12, 13) of the bodies (11) of adjacent spacing sleeves (10) in contact with each other, and wherein said holding means comprise one or more projections (14), each extending in an axial direction from the bearing surface (12) located at said one end of the body (11), and wherein, at its other end, the body (11) is provided with a corresponding number of recesses (21), each extending in an axial direction into the body (11) from the bearing surface (13) located at this end and serving to receive one of said projections (14) of another spacing sleeve (10), and wherein said recesses (21) are adapted to receive said projection (14) of another spacing sleeve (10) in releasable frictional engagement therewith.

9. Spacing sleeve (10) for use when mounting an object (20) at a certain distance in front of a wall (19) or other similar supporting member by means of a screw (18) or other similar fastening means extending through the spacing sleeve (10), said spacing sleeve comprising a tubular body (11) having two opposite bearing surfaces (12, 13), located each at one end of the body, and holding means (14), connected to the body (11) and located at one end thereof, for releasably holding the spacing sleeve (10) to said object (20) during the mounting of the latter, characterized in that, at its other end, the body (11) is provided with means (21), adapted to receive said holding means (14) of another spacing sleeve (10) in releasable engagement therewith and to permit two or more spacing sleeves (10) to be stacked upon each other and to be releasably held to each other in a mutually centered state and with facing bearing surfaces (12, 13) of the bodies (11) of adjacent spacing sleeves (10) in contact with each other, and wherein said holding means comprise two or more projections (14), each extending in an axial direction from the bearing surface (12) located at said one end of the body (11), and wherein, at its other end, the body (11) is provided with a corresponding number of recesses (21), each extending in an axial direction into the body (11) from the bearing surface (13) located at this end and serving to receive one of said projections (14) of another spacing sleeve (10), and wherein, the projections (14) and the recesses (21) are uniformly distributed around the longitudinal axis of the body (11).

10. Spacing sleeve according to claim 9, characterized in that said recesses (21) are adapted to receive said projections (14) of another spacing sleeve (10) in releasable frictional engagement therewith.

11. Spacing sleeve according to claim 9, characterized in that said projections (14) are releasably snap engaged to the recesses (21) of another spacing sleeve (10).

12. Spacing sleeve according to claim 9, characterized in that said projections have the shape of short cylindrical pins (14) and in that said recesses have the shape of short cylindrical holes (21).

13. Spacing sleeve according to claim 10, characterized in that said holes (21) have mouth portions which are slightly widening in an outward direction.

* * * * *

UNITED STATES PATENT AND TRADEMARK OFFICE
CERTIFICATE OF CORRECTION

PATENT NO. : 6,176,666 B1
DATED : January 23, 2001
INVENTOR(S) : Carl-Gunnar Österlund It is certified that error appears in the above-identified patent and that said Letters Patent is hereby corrected as shown below:

Claim 1, Column 4,
Line 4, after "sleeve (10)" insert:
-- to said object (20) during the mounting of the latter, characterized in that, at its other end, the body (11) is provided with means (21), adapted to receive said holding means (14) of another spacing sleeve (10) --.

Signed and Sealed this

Fourth Day of September, 2001

*Attest:*

NICHOLAS P. GODICI
*Attesting Officer*   Acting Director of the United States Patent and Trademark Office